United States Patent
Okuyama et al.

(10) Patent No.: US 9,359,466 B2
(45) Date of Patent: Jun. 7, 2016

(54) URETHANE-TYPE CURABLE ORGANIC BINDER FOR MOLD, AND MOLDING SAND COMPOSITION AND MOLD OBTAINED USING THE SAME

(71) Applicant: ASAHI ORGANIC CHEMICALS INDUSTRY CO., LTD., Nobeoka-Shi (JP)

(72) Inventors: Kenichirou Okuyama, Inuyama (JP); Tomofumi Tanahashi, Nagoya (JP)

(73) Assignee: Asahi Yukizai Corporation, Nobeoka-Shi (JP)

( * ) Notice: Subject to any disclaimer, the term of this patent is extended or adjusted under 35 U.S.C. 154(b) by 113 days.

(21) Appl. No.: 14/460,460

(22) Filed: Aug. 15, 2014

(65) Prior Publication Data

US 2014/0357810 A1    Dec. 4, 2014

Related U.S. Application Data

(63) Continuation of application No. PCT/JP2013/055950, filed on Mar. 5, 2013.

(30) Foreign Application Priority Data

Mar. 23, 2012 (JP) ................... 2012-066659

(51) Int. Cl.
  *C08G 18/54* (2006.01)
  *C08G 18/76* (2006.01)
  *C08G 18/28* (2006.01)
  *B22C 1/22* (2006.01)

(52) U.S. Cl.
  CPC ............ *C08G 18/542* (2013.01); *B22C 1/2273* (2013.01); *C08G 18/289* (2013.01); *C08G 18/7664* (2013.01); *C08G 18/7671* (2013.01)

(58) Field of Classification Search
  None
  See application file for complete search history.

(56) References Cited

U.S. PATENT DOCUMENTS

| 4,070,334 | A | * | 1/1978 | Green .................... B22C 1/162 164/12 |
| 4,436,881 | A | | 3/1984 | Laitar |
| 4,540,724 | A | | 9/1985 | Dunnavant et al. |
| 4,705,570 | A | | 11/1987 | Paul et al. |
| 5,684,094 | A | | 11/1997 | Suzuki et al. |
| 5,733,952 | A | | 3/1998 | Geoffrey |
| 6,197,882 | B1 | * | 3/2001 | Yanagisawa ......... C08G 18/289 525/102 |
| 6,271,333 | B1 | * | 8/2001 | Okuhira ................. C08G 18/10 525/453 |
| 7,923,572 | B2 | * | 4/2011 | Taniguchi ............ C08K 5/5465 556/413 |

FOREIGN PATENT DOCUMENTS

| CN | 86107616 A | 7/1987 |
| CN | 1171991 A | 2/1988 |
| CN | 1149007 A | 5/1997 |
| EP | 0 976 771 A1 | 2/2000 |
| EP | 0 985 693 A1 | 3/2000 |
| JP | 56-144845 A1 | 11/1981 |
| JP | 57-062835 A1 | 4/1982 |
| JP | 07-242737 A1 | 9/1995 |
| JP | 09-206885 A1 | 8/1997 |
| JP | 2002-265551 A1 | 9/2002 |
| JP | 2004-358531 A1 | 12/2004 |
| JP | 2008-238177 A1 | 10/2008 |
| JP | 2012-196700 A1 | 10/2012 |

OTHER PUBLICATIONS

Extended European Search Report (Application No. 13765217.8) dated Dec. 11, 2015.
Chinese Office Action (Application No. 201380016012.7) dated Jun. 2, 2015.
International Search Report (Application No. PCT/JP2013/055950) dated May 14, 2013.

* cited by examiner

*Primary Examiner* — Randy Gulakowski
*Assistant Examiner* — Christopher M Rodd
(74) *Attorney, Agent, or Firm* — Burr & Brown, PLLC

(57) ABSTRACT

Provided are an organic binder for a mold, which can advantageously extend the pot life without causing uneven curing, reduction in mold strength and an increase in the amount of use of a catalyst; a molding sand composition which is obtained by using the organic binder for a mold, and which exhibits an extended pot life; and a mold produced by curing such a molding sand composition through gas hardening. The urethane-curable type organic binder for a mold, which is used for production of a urethane-based mold, is constituted by comprising a specific alkoxysilyl group-containing ketimine compound, together with a polyol compound and a polyisocyanate compound.

12 Claims, No Drawings

URETHANE-TYPE CURABLE ORGANIC BINDER FOR MOLD, AND MOLDING SAND COMPOSITION AND MOLD OBTAINED USING THE SAME

This application is a continuation of the International Application No. PCT/JP2013/055950, filed Mar. 5, 2013, which claims the benefit under 35 U.S.C. §119(a)-(d) of Japanese Application No. 2012-066659, filed Mar. 23, 2012, the entireties of which are incorporated herein by reference.

BACKGROUND OF THE INVENTION

1. Field of the Invention

The present invention relates to an organic binder for a mold, which is used for production of a phenol-urethane-based gas hardening mold or self-curing mold used in sand casting, a molding sand composition and a mold obtained by using the same.

2. Discussion of Related Art

Conventionally, as one of typical organic molds used in sand casting, there has been known a phenol-urethane-based mold produced by using, as binder components, a polyol compound consisting of a phenolic resin and a polyisocyanate compound, and utilizing a polyaddition reaction (urethanization reaction) therebetween. As this phenol-urethane-based mold, there have been widely known a mass production type gas hardening mold produced by an amine cold box process, which requires no heating in production thereof, and a non-mass production type self-curing mold produced by an ordinary temperature self-curing process.

Specifically described, in the above-mentioned amine cold box process, the gas hardening mold is generally produced by kneading a granular refractory molding sand with an organic binder for a mold, which is composed of an organic solvent solution of a phenolic resin and a polyisocyanate compound solution, by using a mixer, for thereby producing a molding sand composition in which the surface of the molding sand is coated with the organic binder, and thereafter blowing the molding sand composition into a suitable forming mold to form a mold, and passing an amine-based catalyst gas through the forming mold to cure the molding sand composition. On the other hand, in the ordinary temperature self-curing process, the self-curing mold is produced by mixing a curing catalyst with a granular refractory molding sand and an organic binder for a mold, which is composed of an organic solvent solution of a phenolic resin and a polyisocyanate compound solution, during kneading of the molding sand and the organic binder, and immediately forming the resulting mixture into a desired shape.

As described above, in the amine cold box process, the molding sand composition is cured by bringing the amine-based catalyst gas into contact with the molding sand composition. In such a molding sand composition, however, the urethanization reaction gradually proceeds at a stage where the phenolic resin component and the polyisocyanate component that constitute the organic binder are mixed with each other, giving rise to a risk that the molding sand composition begins to cure at this stage. Accordingly, in the case where the mold is produced by using the molding sand composition stored in a sand hopper in a production setting for a long period of time, particularly in the case where the mold is produced in a high temperature and humidity environment, for example, the produced mold has a strength significantly lower than the desired mold strength, and sometimes various production failures are caused. Thus, production troubles due to the pot life of the molding sand composition tend to be caused. Further, where the pot life of the molding sand composition is short, there arises a need for additional work for removing the molding sand composition that is left in the sand hopper and became unusable, leading to reduction of the production efficiency of the mold.

Under the above-described circumstances, various compounds have been proposed as pot life extenders or curing retardants for extending the pot life of the molding sand composition. For example, U.S. Pat. No. 4,436,881 (Patent Document 1) proposes organic phosphorous compounds such as dichloroarylphosphines, chlorodiarylphosphines and arylphosphonic dichlorides, as compounds which extend the pot life of the molding sand composition. Further, U.S. Pat. No. 4,540,724 (Patent Document 2) proposes phosphorus halides such as phosphorus oxychloride, phosphorus trichloride and phosphorus pentachloride. Also, isophthalic acid chlorides and acids such as salicylic acid, benzoic acid, phosphoric acid, acidic phosphoric ester and boric acid have been conventionally used as the pot life extenders, because they inhibit the urethanization reaction.

Although the above-described conventional pot life extenders have an effect of inhibiting the urethanization reaction to retard curing of the molding sand composition, a further effect cannot be achieved even where they are added in an excessive amount over a predetermined amount, so that a sufficiently long pot life has not been achieved by addition of these conventional pot life extenders. Further, such pot life extenders inhibit catalysis of amine-based curing catalysts used for promoting the above-mentioned urethanization reaction, giving rise to inherent problems of uneven curing and reduction of the mold strength, which would result in formation of a hole in the mold at the time of its removal from a forming mold, and a further inherent problem that the amine-based curing catalysts are required to be used in larger amounts than necessary, in order to prevent such uneven curing and reduction of the mold strength.

SUMMARY OF THE INVENTION

The present invention was made in view of the background art described above. Therefore, it is a problem to be solved by the invention to provide an organic binder for a mold, which can advantageously extend the pot life without causing uneven curing, reduction of the mold strength and an increase in the required amount of the catalyst. Other problems to be solved by the invention are to provide a molding sand composition which is obtained by using such an organic binder for a mold and which has an extended pot life, and to provide a mold produced by curing such a molding sand composition through gas hardening.

The above-described problem can be solved according to a gist of the invention which provides a urethane-curable type organic binder for a mold, which is used for production of a urethane-based mold, characterized in that the binder comprises a polyol compound and a polyisocyanate compound, and further comprises an alkoxysilyl group-containing ketimine compound represented by the following general formula (1),

[Chemical Formula 1]

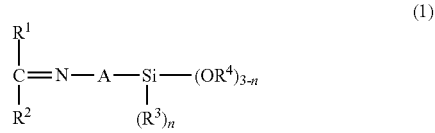

wherein "R¹", "R²", "R³" and "R⁴" are the same or different monovalent organic groups, "A" is a divalent organic group, and "n" indicates an integer of 0 to 2.

Namely, the organic binder for a mold according to the present invention comprises the specific alkoxysilyl group-containing ketimine compound, so that while the molding sand composition obtained by using the organic binder waits to be used for production of the mold, the alkoxysilyl group-containing ketimine compound is gradually hydrolyzed by water in the air and becomes an alkoxysilyl group-containing amine compound containing a primary amino group, which predominantly reacts with the polyol compound or the polyisocyanate compound to form a prepolymer. Then, during curing of the molding sand composition by using a curing catalyst gas, such a prepolymer easily and instantaneously reacts with the polyol compound or the polyisocyanate compound, through a cross-linking reaction, to advantageously contribute to make the resulting mold exhibit a desired degree of the strength.

The prepolymer formed as a result of the reaction between the alkoxysilyl group-containing amine compound and the polyol compound or the polyisocyanate compound is gradually cured with the elapse of time through the cross-linking reaction to decrease cross-linking points to be reacted. Therefore, it is concerned that the desired degree of the mold strength is difficult to achieve when the mold is cured by using the curing catalyst gas. However, in the present invention, whereas the prepolymer is cured through the cross-linking reaction, the alkoxysilyl group-containing amine compound is always and continuously formed by the hydrolysis of the alkoxysilyl group-containing ketimine compound remaining in the molding sand composition, and the prepolymer is formed as a result of the reaction between the alkoxysilyl group-containing amine compound and the polyol compound or the polyisocyanate compound. Further, in the case where the amine-based catalyst gas is used, the alkoxysilyl group-containing amine compound which is always present in the molding sand composition also acts as the curing catalyst, since it is an amine-based compound like the curing catalyst gas. Accordingly, improvement is achieved in that the amount of use of the curing catalyst as a whole can be reduced. Further, the uneven curing and reduction of the mold strength, which would be caused by inhibition of the catalysis as observed in the conventional pot life extenders, can be advantageously avoided. Thus, the pot life can be effectively extended according to the present invention.

According to one preferred form of the above-mentioned urethane-curable type organic binder for a mold according to the present invention, the monovalent organic groups in the above-indicated general formula (1) are hydrocarbon groups having 1 to 10 carbon atoms, while the divalent organic group in the above-indicated general formula (1) is a divalent hydrocarbon group having 1 to 5 carbon atoms. Further, the above-mentioned polyol compound is preferably a phenolic resin, and an ortho-cresol-modified phenolic resin is preferably used as the phenolic resin.

According to another preferred form of the urethane-curable type organic binder for a mold according to the present invention, the above-mentioned alkoxysilyl group-containing ketimine compound is N-(1,3-dimethyl-butylidene)-3-(triethoxysilyl)-1-propanamine. Further, according to still another preferred forms, the above-mentioned polyol compound and polyisocyanate compound are used at a ratio in a range between 80:20 and 20:80 on the mass basis, and the above-mentioned alkoxysilyl group-containing ketimine compound is used in an amount of 0.05-15 parts by mass per 100 parts by mass of the polyol compound.

Another gist of the present invention is to provide a molding sand composition obtained by coating a molding sand with the above-described urethane-curable type organic binder for a mold. According to one preferred form of such a molding sand composition according to the present invention, the above-mentioned polyol compound and polyisocyanate compound are each used in an amount of 0.01-5.0 parts by mass per 100 parts by mass of the molding sand. A still another gist of the present invention is to provide a mold obtained by molding and curing the above-described molding sand composition. It is preferable that the molding sand composition is cured by passing a curing catalyst gas therethrough.

As described above, in the urethane-curable type organic binder for a mold according to the present invention, the specific alkoxysilyl group-containing ketimine compound is used in addition to the polyol compound and polyisocyanate compound that have hitherto been widely used, so that the effective extension of the pot life can be advantageously realized without causing uneven curing and reduction of the mold strength, and without increasing the required amount of the catalyst to be used.

DETAILED DESCRIPTION OF THE INVENTION

A polyol compound which is used as one of main components of an organic binder for a mold according to the present invention is not particularly limited, and various known polyol compounds that have been conventionally used in production of urethane-based curing molds are appropriately selected and used. Specific examples of the polyol compound include phenolic resins, polyether polyols, polypropylene polyols, polybutadiene polyols, polymer polyols, polypropylene glycol, polyethylene glycol, polytetramethylene ether glycol, polyoxybutylene glycol, copolymers of ethylene oxide and propylene oxide, copolymers of tetrahydrofuran and ethylene oxide, copolymers of tetrahydrofuran and propylene oxide and copolymers of tetrahydrofuran and 3-methyltetrahydrofuran.

Among these polyol compounds, various known phenolic resins that have been used in production of phenol-urethane-based molds can be suitably used as the polyol compound used in production of the urethane-based mold. Specific examples of the phenolic resins that can be suitably used include: benzylether-type phenolic resins, resol-type phenolic resins and novolac-type phenolic resins, which are soluble in organic solvents and obtained by conducting an addition-condensation reaction between phenols and aldehydes in the presence of a reaction catalyst in such a manner that the amount of the aldehydes is generally 0.5-3.0 moles per 1 mole of the phenols; modified phenolic resins thereof; and a mixture thereof. Any one or any combination of these phenolic resins is appropriately selected and used. Among these phenolic resins, ortho-cresol-modified phenolic resins modified with ortho-cresol, and mixtures of the ortho-cresol-modified phenolic resins and other phenolic resins are particularly suitably used in the present invention, because they are not only excellent in solubility in the organic solvents and compatibility with polyisocyanates, but also capable of effectively improving the strength of the mold to be obtained.

The catalyst used in the above-mentioned addition-condensation reaction between the phenols and the aldehydes is not particularly limited, and is adequately selected from various catalysts such as acidic catalysts and basic catalysts that have been conventionally used in production of the phenolic resins, depending on the type of the desired phenolic resin. Examples of the catalyst include metal salts or compounds containing metal elements such as tin, lead, zinc, cobalt, manganese and nickel. More specific examples of the catalyst include, lead naphthenate, zinc naphthenate, lead acetate, zinc chloride, zinc borate, lead oxide, and combinations of acids and bases that can form these metal salts. In the case where these metal salts or compounds are employed as the reaction catalyst, the amount of the reaction catalyst is not particularly limited, but the reaction catalyst is generally used in an amount of 0.01-5 parts by mass per 100 parts by mass of the phenols.

Examples of the phenols for providing the phenolic resins include: alkyl phenols such as phenol, cresol, xylenol, p-tert-butylphenol and nonylphenol; polyhydric phenols such as resorcinol, bisphenol F and bisphenol A; and mixtures thereof. On the other hand, examples of the aldehydes include formaldehyde, formalin, paraformaldehyde, polyoxymethylene, glyoxal, furfural and mixtures thereof.

Further, examples of the ortho-cresol-modified phenolic resins as one of the phenolic resins that can be advantageously employed in the present invention include: a copolycondensation type ortho-cresol-modified phenolic resin (a); a mixed type ortho-cresol-modified phenolic resin (b), which resins (a) and (b) are obtained by reacting ortho-cresol and/or phenol with an aldehyde in the presence of a reaction catalyst such as a metal salt; a modified type ortho-cresol-modified phenolic resin (c) obtained by modifying these resins (a) and (b) by using a modifying agent; and a mixture of two or more of these resins (a), (b) and (c).

More specifically described, the above-mentioned copolycondensation type ortho-cresol-modified phenolic resin (a) is a copolycondensation resin obtained by simultaneously or sequentially reacting ortho-cresol and phenol with an aldehyde. Depending on reaction conditions such as the kind of the reaction catalyst to be used, there can be obtained a copolycondensation type ortho-cresol-modified phenolic resin of a novolac-type, resol-type or benzylether-type resin, or a copolycondensation type ortho-cresol-modified phenolic resin of any combination of the novolac-type, resol-type and benzylether-type. In the present invention, the copolycondensation type ortho-cresol-modified phenolic resin of the benzylether-type is preferably used, as described above. From the viewpoint of improving strength properties of the mold, the ratio (mass ratio) of ortho-cresol/phenol is preferably from 1/99 to 90/10, and more preferably from 5/95 to 80/20.

Further, the above-mentioned mixed type ortho-cresol-modified phenolic resin (b) is obtained by mixing: at least one ortho-cresol resin selected from the group consisting of novolac-type, resol-type and benzylether-type ortho-cresol resins obtained by reacting ortho-cresol with an aldehyde; and at least one phenolic resin selected from the group consisting of novolac-type, resol-type and benzylether-type phenolic resins obtained by reacting phenol with an aldehyde. In the present invention, it is preferable to use a benzylether-type and mixed type ortho-cresol-modified phenolic resin obtained by mixing the benzylether-type ortho-cresol resin and the benzylether-type phenolic resin. In such a mixed type ortho-cresol-modified phenolic resin, the ratio (mass ratio) of the ortho-cresol resin/the phenolic resin is preferably from 1/99 to 90/10, and more preferably from 5/95 to 80/20, from the viewpoint of improving the strength properties of the mold.

In addition, the above-mentioned modified type ortho-cresol-modified phenolic resin (c) is at least one modified type ortho-cresol-modified phenolic resin selected from the group consisting of the novolac-type, resol-type and benzylether-type phenolic resins which are modified by mixing or reacting any modifying agent with the copolycondensation type ortho-cresol-modified phenolic resin, the ortho-cresol resin or the phenolic resin, during or after production of these resins. Examples of the modifying agent include an alkyd resin, an epoxy resin, a melamine resin, a urea resin, a xylene resin, a vinyl acetate resin, a polyamide resin, a urea-based compound, a melamine compound, an epoxy-based compound, furfuryl alcohol, polyvinyl alcohol, urea, an amide, linseed oil, cashew nut shell liquid, rosin, a starch and a monosaccharide. In the present invention, the benzylether-type and modified type ortho-cresol-modified phenolic resin is advantageously used.

The polyol compound such as the phenolic resin, which is used as one of the main components of the organic binder for a mold according to the invention, is generally dissolved in an organic solvent consisting of a combination of a polar organic solvent and a nonpolar organic solvent, from the viewpoints of viscosity reduction, compatibility with a polyisocyanate solution which will be described later, coating properties with respect to a molding sand, physical properties of the mold to be obtained, and the like. The polyol compound is used in the state of a solution (hereinafter referred to as a "polyol solution") having a concentration of the polyol compound of about 30-80% by mass.

On the other hand, the polyisocyanate compound, which is used as another main component of the organic binder for a mold according to the present invention, is a compound which has two or more isocyanate groups in its molecule, and which reacts with active hydrogen of the polyol compound such as the above-described phenolic resin, through a polyaddition reaction, to chemically bind molding sand particles with one another by urethane bonds such as phenol urethane. Specific examples of the polyisocyanate compound include various known polyisocyanates including aromatic, aliphatic or alicyclic polyisocyanates such as diphenylmethane diisocyanate, polymethylenepolyphenylene polyisocyanate (hereinafter referred to as "polymeric MDI"), hexamethylene diisocyanate and 4,4'-dicyclohexylmethane diisocyanate, as well as prepolymers which are obtained by reacting these compounds with polyols, and which have two or more isocyanate groups. Any one or any combination of these polyisocyanate compounds may be used.

Such a polyisocyanate compound is generally dissolved in a nonpolar organic solvent or a mixed solvent consisting of a combination of a nonpolar organic solvent and a polar solvent, for the same reasons described above with respect to the polyol compound such as the phenolic resin. The polyisocyanate compound is used in the state of a solution having a concentration of the polyisocyanate compound of about 40-90% by mass. In this respect, it is noted that depending on the kind of the polyisocyanate compound to be used, the polyisocyanate compound need not be dissolved in the organic solvent, and can be used as a neat liquid thereof. Hereinafter, both of the neat liquid of the polyisocyanate compound and the solution obtained by dissolving the polyisocyanate compound in the organic solvent will be referred to as a polyisocyanate solution.

The organic solvent used for dissolving the above-mentioned polyol compound or polyisocyanate compound is not particularly limited as long as the organic solvent is unreactive with the polyisocyanate compound and is a good solvent to the solute (the polyol compound or polyisocyanate compound) to be dissolved therein. Generally, a combination of the polar solvent (i) for dissolving the polyol compound such as the phenolic resin and the nonpolar solvent (ii) for dissolving the polyisocyanate compound is used, wherein the amount of the nonpolar solvent (ii) is set so as not to cause separation of the polyol compound such as the phenolic resin.

More specifically described, examples of the above-mentioned polar solvent (i) include ketones such as isophorone, ethers such as isopropyl ether, and furfuryl alcohol, as well as esters such as aliphatic carboxylic acid esters, particularly, dicarboxylic acid alkyl ester such as a dicarboxylic acid methyl ester mixture (available from Du Pont Kabushiki Kaisha, JAPAN; trade name: DBE; a mixture of dimethyl glutarate, dimethyl adipate and dimethyl succinate), methyl esters of vegetable oil such as rapeseed oil methyl ester, and fatty acid monoesters such as ethyl oleate, ethyl palmitate and a mixture thereof. Examples of the above-mentioned nonpolar solvent (ii) include petroleum-based hydrocarbons such as paraffins, naphthenes and alkylbenzenes, specifically, Ipsol 150 (available from Idemitsu Kosan Co., Ltd.) and HAWS (available from Shell Chemicals Japan Ltd.).

By the way, in the organic binder for a mold according to the present invention, a specific alkoxysilyl group-containing ketimine compound is further used as an essential constituent, in combination with the above-mentioned solutions of the phenolic resin and the polyisocyanate compound. By using this alkoxysilyl group-containing ketimine compound, it is possible to effectively extend the pot life of a molding sand composition (kneaded sand) obtained by mixing the organic binder for a mold according to the present invention with a molding sand.

The alkoxysilyl group-containing ketimine compound which contributes to achieve such an excellent effect is represented by the following general formula (1):

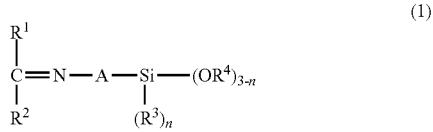

(1)

wherein "$R^1$", "$R^2$", "$R^3$" and "$R^4$" are the same or different monovalent organic groups, "A" is a divalent organic group, and "n" indicates an integer of 0 to 2.

The monovalent organic groups represented by "$R^1$", "$R^2$", "$R^3$" and "$R^4$" in the above-indicated general formula (1) are not particularly limited. However, it is generally preferable that the monovalent organic groups are hydrocarbon groups having 1 to 10 carbon atoms, particularly, straight-chain or branched-chain alkyl groups such as methyl, ethyl, propyl, isopropyl, butyl, isobutyl, pentyl and hexyl. Each of "$R^1$" and "$R^2$" may be a phenyl group, an alkylaryl group or an arylalkyl group. Further, a known divalent group can be selected as the divalent organic group represented by "A". However, it is generally advantageous to employ a divalent hydrocarbon group having 1 to 5 carbon atoms, particularly, a straight-chain or branched-chain alkylene group such as methylene, ethylene, propylene or butylene, as the divalent organic group.

Specific examples of such an alkoxysilyl group-containing ketimine compound include N-(1,3-dimethylbutylidene)-3-(trimethoxysilyl)-1-propanamine, N-(1-methylethylidene)-3-(triethoxysilyl)-1-propanamine, N-(1,3-dimethylbutylidene)-3-(triethoxysilyl)-1-propanamine, N-(1-methylpropylidene)-3-(triethoxysilyl)-1-propanamine, N-(1-methylethylidene)-3-(methyldiethoxysilyl)-1-propanamine, N-(1,3-dimethylbutylidene)-3-(methyldiethoxysilyl)-1-propanamine, N-(1-methyl-propylidene)-3-(methyldiethoxysilyl)-1-propanamine, N-(1-methylethylidene)-3-(ethyldiethoxysilyl)-1-propanamine, N-(1,3-dimethylbutylidene)-3-(ethyldiethoxysilyl)-1-propanamine, N-(1-methylpropylidene)-3-(ethyldiethoxysilyl)-1-propanamine, N-(1-methylethylidene)-3-(methy)dimethoxysilyl)-1-propanamine, N-(1,3-dimethyl-butylidene)-3-(methyldimethoxysilyl)-1-propanamine, N-(1-methylpropylidene)-3-(methyldimethoxysilyl)-1-propanamine, N-(1-methylethylidene)-2-(triethoxysilyl)-1-ethanamine, N-(1,3-dimethyl-butylidene)-2-(triethoxysilyl)-1-ethanamine, N-(1-methylpropylidene)-2-(triethoxysilyl)-1-ethanamine, N-(1-methylethylidene)-2-(methyldiethoxysilyl)-1-ethanamine, N-(1,3-dimethylbutylidene)-2-(methyldiethoxysilyl)-1-ethanamine, N-(1-methyl-propylidene)-2-(methyldiethoxysilyl)-1-ethanamine, N-(1-methylethylidene)-2-(ethyldiethoxysilyl)-1-ethanamine, N-(1,3-dimethylbutylidene)-2-(ethyldiethoxysilyl)-1-ethanamine, N-(1-methylpropylidene)-2-(ethyldiethoxysilyl)-1-ethanamine, N-(1-methylethylidene)-2-(methyldimethoxysilyl)-1-ethanamine, N-(1,3-dimethylbutylidene)-2-(methyldimethoxysilyl)-1-ethanamine, and N-(1-methyl-propylidene)-2-(methyldimethoxysilyl)-1-ethanamine. Although not particularly limited, among these, N-(1,3-dimethylbutylidene)-3-(triethoxysilyl)-1-propanamine is suitably used in the present invention. In this respect, it is noted that N-(1,3-dimethylbutylidene)-3-(triethoxysilyl)-1-propanamine can also be written as 3-triethoxysilyl-N-(1,3-dimethylbutylidene)propylamine.

Any one or any combination of these alkoxysilyl group-containing ketimine compounds may be used.

Thus, the organic binder for a mold according to the present invention is composed of the above-mentioned specific alkoxysilyl group-containing ketimine compound, and the polyol solution and polyisocyanate solution which form the urethane bonds such as phenol urethane. Further, various known additives that have been used in conventional organic binders for molds may also be appropriately selected and blended in this organic binder, as needed. Examples of the additives include pot life extenders other than the above-mentioned alkoxysilyl group-containing ketimine compound, mold release agents, strength deterioration inhibitors and drying prevention agents. However, it goes without saying that these additives are used in quantitative ranges not impairing the effects that can be achieved by the present invention.

Among the above-mentioned various known additives, the pot life extenders (curing retardants) have been conventionally used as a component for inhibiting the urethanization reaction to extend the pot life of the molding sand composition. In the present invention, such pot life extenders can be used for supplementing the effect which is achieved owing to blending of the above-described alkoxysilyl group-containing ketimine compound in the organic binder. Preferred examples of such pot life extenders include isophthalic acid chloride, salicylic acid, benzoic acid, phosphoric acid, acidic phosphate esters, phosphorous chlorides and boric acid.

Further, the mold release agent is an additive used for decreasing resistance at the time of removal of the mold obtained by using the organic binder according to the present invention, from a forming mold, and preventing occurrence of stain due to adhesion of a part of the molding sand composition blown into the forming mold, to the forming mold, at the time of removal of the mold from the forming mold, for thereby obtaining the mold having a uniform molded surface and a high degree of accuracy. Preferred examples of the mold release agent include long-chain fatty acids, long-chain fatty acid esters, tall oil fatty acids, alkyd resins and liquid polybutadiene. These can be used generally in an amount of about 0.01-100 parts by mass, and preferably in an amount of about 0.1-10 parts by mass, per 100 parts by mass of the polyol compound.

Further, the strength deterioration inhibitor is used for preventing deterioration of the mold strength in high humidity environments, and improving adhesion between the resin component of the organic binder and the molding sand. For this purpose, conventionally used silane coupling agents can be utilized. Preferred examples of the strength deterioration inhibitor include silane coupling agents including amino-based silanes such as N-β(aminoethyl)-γ-aminopropyltrimethoxysilane and γ-aminopropyltriethoxysilane, and epoxy-based silanes such as γ-glycidoxypropyltrimethoxysilane. Such a strength deterioration inhibitor is advantageously used generally in an amount of about 0.01-5 parts by mass, and preferably in an amount of about 0.05-4 parts by mass, per 100 parts by mass of the polyol compound.

Thus, the urethane-curable type organic binder for a mold according to the present invention is constituted by the above-described various components, and the urethane-based gas hardening mold is produced by using this organic binder.

Specifically described, to produce the gas hardening mold by a cold box process, initially, the above-mentioned organic binder for a mold is kneaded with the molding sand, for thereby producing the molding sand composition (kneaded sand) in which the surface of the molding sand is coated with the organic binder for a mold. Namely, the molding sand is sufficiently kneaded and mixed with the organic binder composed of the polyol solution, the polyisocyanate solution, the specific alkoxysilyl group-containing ketimine compound and various other additives as needed, to coat the surface of the molding sand with the organic binder, whereby the desired molding sand composition (RCS) is produced. In that case, the alkoxysilyl group-containing ketimine compound and the various additives may be added to and mixed with either one or both of the polyol solution and the polyisocyanate solution which are prepared separately from each other, or may be dissolved or dispersed in an appropriate organic solvent and mixed with the molding sand together with the polyol solution and the polyisocyanate solution at the time of kneading, or may be directly added to and mixed with the polyol compound after condensation is completed in the production of the phenolic resin, for example, so that the alkoxysilyl group-containing ketamine compound and the various additives can be uniformly mixed in the molding sand composition.

The polyaddition reaction (urethanization reaction) between the polyol solution and the polyisocyanate solution that constitute the organic binder gradually proceeds from a stage where these solutions are mixed. Therefore, in production of the molding sand composition, these polyol solution and polyisocyanate solution are prepared separately from each other in advance, and usually mixed with each other when they are kneaded with the molding sand. Such a kneading-mixing operation is preferably performed by using a continuous-type or batch-type mixer as in conventional production of the molding sand composition, at a temperature in a range from −10° C. to 50° C.

After the thus obtained molding sand composition is formed in the forming mold which gives the desired shape, a curing catalyst gas is passed through the forming mold to promote curing of the molding sand composition, whereby the gas hardening mold is produced. Examples of the catalyst gas include cyclic nitrogen compounds such as pyridine, N-ethylmorphoiine, as well as various known tertiary amine gases such as triethylamine, dimethylethylamine and diisopropylamine. At least one of these is appropriately selected and used in a usual quantitative range. Particularly, in the gas hardening mold obtained by curing the above-described molding sand composition by bringing the tertiary amine gas into contact with the molding sand composition, uneven curing is advantageously prevented without increasing the amount of use of the tertiary amine as the curing catalyst, and a high degree of the mold strength is secured.

In the preparation of the molding sand composition which gives the above-mentioned gas hardening mold, the polyol solution and the polyisocyanate solution are suitably used such that the polyol compound and the polyisocyanate compound as active ingredients thereof are each contained in an amount of 0.01-5.0 parts by mass, preferably 0.1-2.0 parts by mass, per 100 parts by mass of the molding sand. Further, although the ratio between the polyol compound and the polyisocyanate compound is not particularly limited, the polyol solution and the polyisocyanate solution are generally used in combination such that the ratio between the polyol compound and the polyisocyanate compound is in a range between 80:20 and 20:80, on the mass basis.

Further, the amount of use of the specific alkoxysilyl group-containing ketimine compound with respect to the molding sand is not univocally defined, and is appropriately set depending on the kind of the alkoxysilyl group-containing ketimine compound to be used, required properties and the like. However, in view of cost and the like, the alkoxysilyl group-containing ketimine compound is used generally in an amount of about 0.05-15 parts by mass, preferably in an amount of about 0.1-5 parts by mass, per 100 parts by mass of the polyol compound. Further, the alkoxysilyl group-containing ketimine compound is used generally in an amount of about 0.0005-0.15 part by mass, more preferably in an amount of about 0.001-0.1 part by mass, per 100 parts by mass of the molding sand.

The molding sand used in the present invention is not particularly limited, and may be either natural sand or artificial sand, as long as it is a refractory sand conventionally used for production of the molds. Examples of the molding sand include silica sand, olivine sand, zircon sand, chromite sand, ferrochromium-based slag, ferronickel-based slag, converter slag, mullite-based artificial particles (for example, commercial name: "CERABEADS" available from Itochu Ceratech Corp.), alumina-based artificial particles, various other artificial particles and reclaimed sand or recovered sand thereof. Any one or any combination of these molding sands may be used. Among these, the mullite-based or alumina-based artificial particles that are spherical and excellent in fracture resistance are more suitably used, from the viewpoint of polishing reclamation processing after mold recovery. In the case where the reclaimed sand or the recovered sand is employed as the molding sand, the pot life of the molding sand composition generally tends to become shorter as compared with a case where a fresh sand is used. However, a significant effect of extending the pot life can be achieved owing to the use of the above-described organic binder for a mold according to the present invention.

Thus, in the gas hardening mold produced as described above, the strength of the mold can be effectively improved, so that the mold is advantageously used for production of cast products composed of various metals such as aluminum alloys, magnesium alloys, iron and so on.

EXAMPLES

To clarify the present invention more specifically, some examples of the invention will be described below, but it goes without saying that the present invention is not limited to the details of such examples. Further, it is to be understood that in addition to the illustrated examples and the foregoing description, the present invention may be embodied with various other changes, modifications and improvements, which may occur to those skilled in the art without departing from the spirit and scope of the invention.

—Measurement of Mold Strength—

A sand magazine of a cold box molding machine was charged with a kneaded molding sand composition, and then the molding sand composition was blown into a mold for producing a flexural strength test piece, at a gauge pressure of 0.3 MPa. After triethylamine gas was passed through the mold by using a gas generator, at a gauge pressure of 0.2 MPa for 1 second, air purging was performed at a gauge pressure of 0.2 MPa for 14 seconds, and then the resulting product was removed from the mold, whereby the flexural test piece having a width of 30 mm, a length of 85 mm and a thickness of 10 mm was prepared. Immediately after the production of the test piece, the flexural strength or bending strength (N/cm$^2$) of the test piece was measured by using a digital molding sand strength tester (manufactured by Takachiho Seiki Co., Ltd.). In this respect, it is noted that other than the molding sand composition which was used immediately after the kneading (immediately after the preparation), and which had no waiting time after the kneading, there were provided molding sand compositions which were left in a polyethylene bag for a predetermined length of time (2 hours or 4 hours), in an environment of a temperature of 30° C. and a relative humidity of 60%, and which had a waiting time of 2 hours or 4 hours.

First, a phenolic resin solution A and a phenolic resin solution B as polyol solutions and a polyisocyanate solution were prepared as described below. Then, by using these phenolic resin solution A or phenolic resin solution B, and the polyisocyanate solution, molding sand compositions according to Examples 1 to 16 and Comparative Examples 1 to 9 were prepared.

—Preparation of Phenolic Resin Solution A—

A three-necked flask equipped with a reflux condenser, a thermometer and a stirrer was charged with 50 parts by mass of phenol, 50 parts by mass of ortho-cresol (phenol/ortho-cresol=50/50), 51.9 parts by mass of 92% by mass paraformaldehyde and 0.15 part by mass of zinc naphthenate as a divalent metal salt. A reaction of the contents in the flask was carried out at a reflux temperature for 90 minutes, followed by heat concentration, whereby a benzylether-type ortho-cresol-modified phenolic resin (phenolic resin A) having a water content of 1% by mass or less was obtained. This phenolic resin A was diluted by using an organic solvent consisting of a mixture of DBE:Ipsol 150:HAWS=45:45:10, to prepare the phenolic resin solution A having a phenolic resin content of 50% by mass.

—Preparation of Phenolic Resin Solution B—

A three-necked flask equipped with a reflux condenser, a thermometer and a stirrer was charged with 100 parts by mass of phenol, 55.5 parts by mass of 92% by mass paraformaldehyde and 0.15 part by mass of zinc naphthenate as a divalent metal salt. A reaction of the contents in the flask was carried out at a reflux temperature for 90 minutes, followed by heat concentration, whereby a benzylether-type phenolic resin (phenolic resin B) having a water content of 1% by mass or less was obtained. This phenolic resin B was diluted by using an organic solvent consisting of a mixture of DBE:Ipsol 150:HAWS=45:45:10, to prepare the phenolic resin solution B having a phenolic resin content of 50% by mass.

—Preparation of Polyisocyanate Solution—

Polymeric MDI which is a polyisocyanate compound was diluted by using an organic solvent consisting of a mixture of Ipsol 150:HAWS=60:40, and phthaloyl chloride was added in an amount of 0.93% by mass based on polymeric MDI, to prepare the polyisocyanate solution having a polyisocyanate compound content of 75% by mass.

Example 1

First, 0.2 part by mass of N-(1,3-dimethylbutylidene)-3-(triethoxysilyl)-1-propanamine was added to 100 parts by mass of the phenolic resin solution A, and dissolved therein by stirring. Then, a Shinagawa-shiki desktop mixer (manufactured by Dalton Co., Ltd.) was charged with: 1000 parts by mass of a flattery silica sand which had been left in an atmosphere of a temperature of 30° C. and a relative humidity of 60%, for 24 hours; 10 parts by mass of the phenolic resin solution A containing N-(1,3-dimethylbutylidene)-3-(triethoxysilyl)-1-propanamine; and 10 parts by mass of the polyisocyanate solution prepared as described above. The contents in the mixer were stirred and kneaded for 40 seconds, to prepare a molding sand coated with an organic binder, namely, a molding sand composition.

Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 1 given below.

Examples 2 to 4

Molding sand compositions according to the respective Examples were prepared like the Example 1, by the same manner described above with respect to the preparation of the molding sand composition of the Example 1, except that N-(1,3-dimethylbutylidene)-3-(triethoxysilyl)-1-propanamine was added in respective amounts shown in Table 1 given below. Then, with respect to the thus prepared molding sand compositions, the mold strength was measured according to the above-described test method, by using the molding sand compositions having no waiting time after the kneading (used immediately after the kneading) and the molding sand compositions having a waiting time of 2 hours or 4 hours. The results of the measurement are shown in Table 1 given below.

Examples 5 to 8

Molding sand compositions according to the respective Examples were prepared like the Examples 1 to 4, by the same manner described above with respect to the preparation of the molding sand composition of the Example 1, except that N-(1,3-dimethylbutylidene)-3-(trimethoxysilyl)-1-propanamine was used in place of N-(1,3-dimethylbutylidene)-3-(triethoxysilyl)-1-propanamine. Then, with respect to the thus prepared molding sand compositions, the mold strength was measured according to the above-described test method, by using the molding sand compositions having no waiting time after the kneading (used immediately after the kneading) and the molding sand compositions having a waiting time of 2 hours or 4 hours. The results of the measurement are shown in Table 1 given below.

Examples 9 to 14

Molding sand compositions according to the respective Examples were prepared like the Example 3, by the same manner described above with respect to the preparation of the molding sand composition of the Example 1, except that 2 parts by mass of the respective alkoxysilyl group-containing ketimine compounds shown in Table 1 were added in place of N-(1,3-dimethylbutylidene)-3-(triethoxysilyl)-1-propanamine. Then, with respect to the thus prepared molding sand compositions, the mold strength was measured according to the above-described test method, by using the molding sand compositions having no waiting time after the kneading (used immediately after the kneading) and the molding sand compositions having a waiting time of 2 hours or 4 hours. The results of the measurement are shown in Table 1 given below.

Comparative Example 1

A molding sand composition was prepared like the Example 1, by the same manner described above with respect to the preparation of the molding sand composition of the Example 1, except that the phenolic resin solution A not containing N-(1,3-dimethylbutylidene)-3-(triethoxysilyl)-1-propanamine was used in place of the phenolic resin solution A containing N-(1,3-dimethylbutylidene)-3-(triethoxysilyl)-1-propanamine. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 1 given below.

Comparative Examples 2 to 5

Molding sand compositions according to the respective Comparative Examples were prepared like the Example 1, by the same manner described above with respect to the preparation of the molding sand composition of the Example 1, except that 3-(triethoxysilyl)-1-propanamine was added in respective amounts shown in Table 1 in place of N-(1,3-dimethylbutylidene)-3-(triethoxysilyl)-1-propanamine. Then, with respect to the thus prepared molding sand compositions, the mold strength was measured according to the above-described test method, by using the molding sand compositions having no waiting time after the kneading (used immediately after the kneading) and the molding sand compositions having a waiting time of 2 hours or 4 hours. The results of the measurement are shown in Table 1 given below.

Comparative Example 6

A molding sand composition was prepared like the Example 1, by the same manner described above with respect to the preparation of the molding sand composition of the Example 1, except that 2 parts by mass of N-phenyl-3-(triethoxysilyl)-1-propanamine was added in place of N-(1,3-dimethyl-butylidene)-3-(triethoxysilyl)-1-propanamine. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 1 given below.

Comparative Example 7

A molding sand composition was prepared like the Example 1, by the same manner described above with respect to the preparation of the molding sand composition of the Example 1, except that 2 parts by mass of N-(1-methylethylidene)phenylamine was added in place of N-(1,3-dimethylbutylidene)-3-(triethoxysilyl)-1-propanamine. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 1 given below.

Comparative Example 8

A molding sand composition was prepared like the Example 1, by the same manner described above with respect to the preparation of the molding sand composition of the Example 1, except that 2 parts by mass of N-(1-methylethylidene)phenylamine was added in place of N-(1,3-dimethyl-butylidene)-3-(triethoxysilyl)-1-propanamine, and 2 parts by mass of 3-glycidoxypropyltrimethoxysilane was further added. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 1 given below.

TABLE 1

| | | Pot Life Extending Component | | | Strength (N/cm²) Immediately after Removal from Mold Waiting Time of Molding Sand Composition | | |
|---|---|---|---|---|---|---|---|
| | | Phenolic Resin Solution | Kind | Addition Amount (parts by mass) | Immediately after Kneading | After 2 Hours | After 4 Hours |
| Examples | 1 | A | N-(1,3-dimethylbutylidene)-3-(triethoxysilyl)-1-propanarnine | 0.2 | 187 | 162 | 129 |
| | 2 | A | N-(1,3-dimethylbutylidene)-3-(triethoxysilyl)-1-propanamine | 1 | 194 | 170 | 140 |
| | 3 | A | N-(1,3-dimethylbutylidene)-3-(triethoxysilyl)-1-propanamine | 2 | 195 | 173 | 145 |
| | 4 | A | N-(1,3-dimethylbutylidene)-3-(triethoxysilyl)-1-propanamine | 5 | 192 | 167 | 136 |
| | 5 | A | N-(1,3-dimethylbutylidene)-3-(trimethoxysilyl)-1-propanamine | 0.2 | 185 | 158 | 126 |
| | 6 | A | N-(1,3-dimethylbutylidene)-3-(trimethoxysilyl)-1-propanamine | 1 | 192 | 166 | 135 |
| | 7 | A | N-(1,3-dimethylbutylidene)-3-(trimethoxysilyl)-1-propanamine | 2 | 194 | 170 | 138 |
| | 8 | A | N-(1,3-dimethylbutylidene)-3-(trimethoxysilyl)-1-propanamine | 5 | 190 | 165 | 132 |
| | 9 | A | N-(1,3-dimethylbutylidene)-3-(methyldiethoxysilyl)-1-propanamine | 2 | 193 | 168 | 135 |
| | 10 | A | N-(1-methylethylidene)-3-(triethoxysilyl)-1-propanamine | 2 | 188 | 156 | 124 |
| | 11 | A | N-(1,3-dimethylbutylidene)-2-(triethoxysilyl)-1-ethanamine | 2 | 191 | 160 | 132 |

TABLE 1-continued

|   |   |   | | | | |
|---|---|---|---|---|---|---|
| 12 | A | N-(1-methylethylidene)-2-(triethoxysilyl)-1-ethanamine | 2 | 186 | 153 | 120 |
| 13 | A | N-(1,3-dimethylbutylidene)-2-(ethyldiethoxysilyl)-1-ethanamine | 2 | 190 | 162 | 135 |
| 14 | A | N-(1,3-dimethylbutylidene)-2-(methyldimethoxysilyl)-1-ethanamine | 2 | 189 | 157 | 128 |

| | | Phenolic Resin Solution | Pot Life Extending Component | | Strength (N/cm$^2$) Immediately after Removal from Mold Waiting Time of Molding Sand Composition | | |
|---|---|---|---|---|---|---|---|
| | | | Kind | Addition Amount (parts by mass) | Immediately after Kneading | After 2 Hours | After 4 Hours |
| Comparative Examples | 1 | A | Not used | 0 | 185 | 147 | 87 |
| | 2 | A | 3-(triethoxysilyl)-1-propanamine | 0.2 | 184 | 141 | 69 |
| | 3 | A | 3-(triethoxysilyl)-1-propanamine | 1 | 182 | 127 | Unproducible |
| | 4 | A | 3-(triethoxysilyl)-1-propanamine | 2 | 180 | 100 | Unproducible |
| | 5 | A | 3-(triethoxysilyl)-1-propanamine | 5 | 170 | Unproducible | Unproducible |
| | 6 | A | N-phenyl-3-(triethoxysilyl)-1-propanamine | 2 | 184 | 130 | Unproducible |
| | 7 | A | N-(1-methylethylidene)phenylamine | 2 | 185 | 146 | 85 |
| | 8 | A | N-(1-methylethylidene)phenylamine<br>3-glycidoxypropyltrimethoxysilane | 2<br>2 | 186 | 149 | 93 |

As is apparent from the results in Table 1, with respect to the molding sand compositions which were used 2 or 4 hours after the kneading, it was observed that where the phenolic resin (benzylether-type ortho-cresol-modified phenolic resin) solution A was used as the polyol compound, the molds composed of the molding sand compositions of the Examples 1 to 14 according to the invention have higher degrees of strength as compared with the molds composed of the molding sand compositions of the Comparative Examples 1 to 8 in which no alkoxysilyl group-containing ketimine compound according to the invention was added. In particular, as shown in the Comparative Example 7, the use of the alkoxysilyl group-free ketimine compound is approximately equivalent to the case of containing no ketimine compound in the Comparative Example 1, and is not effective. Further, as is apparent from the results of the Comparative Example 8, even where the alkoxysilyl group-free ketimine compound and the silane compound are mixed in the molding sand composition, almost no effect is achieved in improvement of the mold strength. Thus, it was revealed that only the use of the specific alkoxysilyl group-containing ketimine compound, as in the present invention, is effective. Furthermore, it was observed that, among the alkoxysilyl group-containing ketimine compounds used in the Examples, N-(1,3-dimethyl-butylidene)-3-(triethoxysilyl)-1-propanamine used in the Examples 1 to 4 gives more excellent mold strength and more excellent strength after moisture absorption than N-(1,3-dimethylbutylidene)-3-(trimethoxysilyl)-1-propanamine used in the Examples 5 to 8. Further, it was observed that N-(1,3-dimethylbutylidene)-3-(triethoxysilyl)-1-propanamine gives the highest value of the strength, among the used alkoxysilyl group-containing ketimine compounds.

Example 15

A molding sand composition was prepared like the Example 3, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

Example 16

A molding sand composition was prepared like the Example 12, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

Comparative Example 9

A molding sand composition was prepared like the Comparative Example 1, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

Comparative Example 10

A Molding sand composition was prepared like the Comparative Example 4, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

Comparative Example 11

A Molding sand composition was prepared like the Comparative Example 6, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

Comparative Example 12

A Molding sand composition was prepared like the Comparative Example 7, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

Comparative Example 13

A Molding sand composition was prepared like the Comparative Example 8, by the same manner described above with respect to the preparation of the molding sand composition of the Example 1, except that the phenolic resin solution B was used in place of the phenolic resin solution A. Then, with respect to the thus prepared molding sand composition, the mold strength was measured according to the above-described test method, by using the molding sand composition having no waiting time after the kneading (used immediately after the kneading) and the molding sand compositions having a waiting time of 2 hours or 4 hours. The results of the measurement are shown in Table 2 given below.

As is apparent from the results in Table 2, it was confirmed that in the case where the phenolic resin (benzylether-type phenolic resin) solution B was used as the polyol solution, the molds composed of the molding sand compositions of the Examples 15 and 16 have excellent mold strength and excellent strength after moisture absorption, as compared with the molds composed of the molding sand compositions of the Comparative Examples 9 to 13.

The invention claimed is:

1. A urethane-curable type organic binder for a mold, which is used for production of a urethane-based mold, characterized in that the binder comprises a polyol compound and a polyisocyanate compound, and further comprises an alkoxysilyl group-containing ketimine compound represented by the following general formula (1),

[Chemical Formula 1]

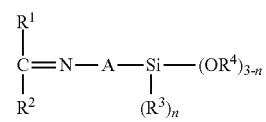

(1)

wherein "$R^1$", "$R^2$", "$R^3$" and "$R^4$" are the same or different monovalent organic groups, "A" is a divalent organic group, and "n" indicates an integer of 0 to 2.

2. The urethane-curable type organic binder for a mold according to claim 1, wherein the monovalent organic groups in the above-indicated general formula (1) are hydrocarbon groups having 1 to 10 carbon atoms.

3. The urethane-curable type organic binder for a mold according to claim 1, wherein the divalent organic group in the above-indicated general formula (1) is a divalent hydrocarbon group having 1 to 5 carbon atoms.

4. The urethane-curable type organic binder for a mold according to claim 1, wherein the polyol compound is a phenolic resin.

5. The urethane-curable type organic binder for a mold according to claim 4, wherein the phenolic resin is an ortho-cresol-modified phenolic resin.

6. The urethane-curable type organic binder for a mold according to claim 1, wherein the alkoxysilyl group-containing ketimine compound is N-(1,3-dimethyl-butylidene)-3-(triethoxysilyl)-1-propanamine.

7. The urethane-curable type organic binder for a mold according to claim 1, wherein the polyol compound and the

TABLE 2

|  |  | Pot Life Extending Component |  |  | Strength (N/cm$^2$) Immediately after Removal from Mold | | |
|---|---|---|---|---|---|---|---|
|  |  | Phenolic Resin Solution | Kind | Addition Amount (parts by mass) | Waiting Time of Molding Sand Composition | | |
|  |  |  |  |  | Immediately after Kneading | After 2 Hours | After 4 Hours |
| Examples | 15 | B | N-(1,3-dimethylbutylidene)-3-(triethoxysilyl)-1-propanamine | 2 | 195 | 155 | 116 |
|  | 16 | B | N-(1-methylethylidene)-2-(triethoxysilyl)-1-thanamine | 2 | 191 | 148 | 107 |
| Comparative Examples | 9 | B | Not used | 0 | 189 | 136 | 70 |
|  | 10 | B | 3-(triethoxysilyl)-1-propanamine | 2 | 182 | 92 | Unproducible |
|  | 11 | B | N-phenyl-3-(triethoxysilyl)-1-propanamine | 2 | 187 | 118 | Unproducible |
|  | 12 | B | N-(1-methylethylidene)phenylamine | 2 | 189 | 134 | 68 |
|  | 13 | B | N-(1-methylethylidene)phenylamine 3-glycidoxypropyltrimethoxysilane | 2 2 | 190 | 138 | 76 | polyisocyanate compound are used at a ratio in a range between 80:20 and 20:80 on the mass basis.

8. The urethane-curable type organic binder for a mold according to claim 1, wherein the alkoxysilyl group-containing ketimine compound is used in an amount of 0.05-15 parts by mass per 100 parts by mass of the polyol compound.

9. A molding sand composition obtained by coating a molding sand with the urethane-curable type organic binder for a mold according to claim 1.

10. The molding sand composition according to claim 9, wherein the polyol compound and the polyisocyanate compound are each used in an amount of 0.01-5.0 parts by mass per 100 parts by mass of the molding sand.

11. A mold obtained by molding and curing the molding sand composition according to claim 9.

12. The mold according to claim 11, wherein the molding sand composition is cured by passing a curing catalyst gas therethrough.

* * * * *